April 9, 1963
J. R. McCONNELL
3,085,148
WELDING MACHINE FOR CONNECTING STRUCTURAL
DETAILS TO STRUCTURAL STEEL MEMBERS
Filed Feb. 6, 1956
8 Sheets-Sheet 3
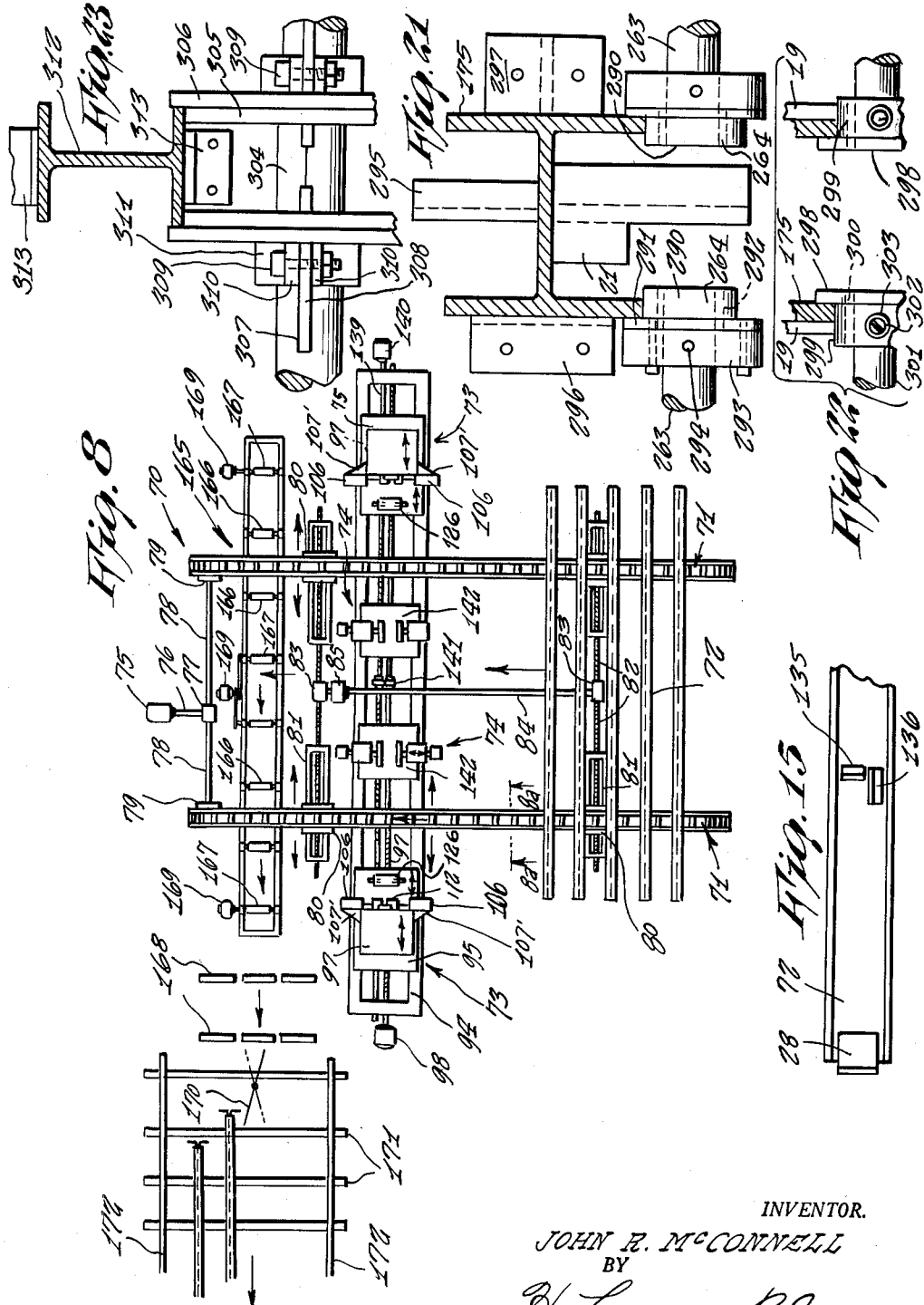
INVENTOR.
JOHN R. McCONNELL
BY
H Lawrence Blasus
AGENT

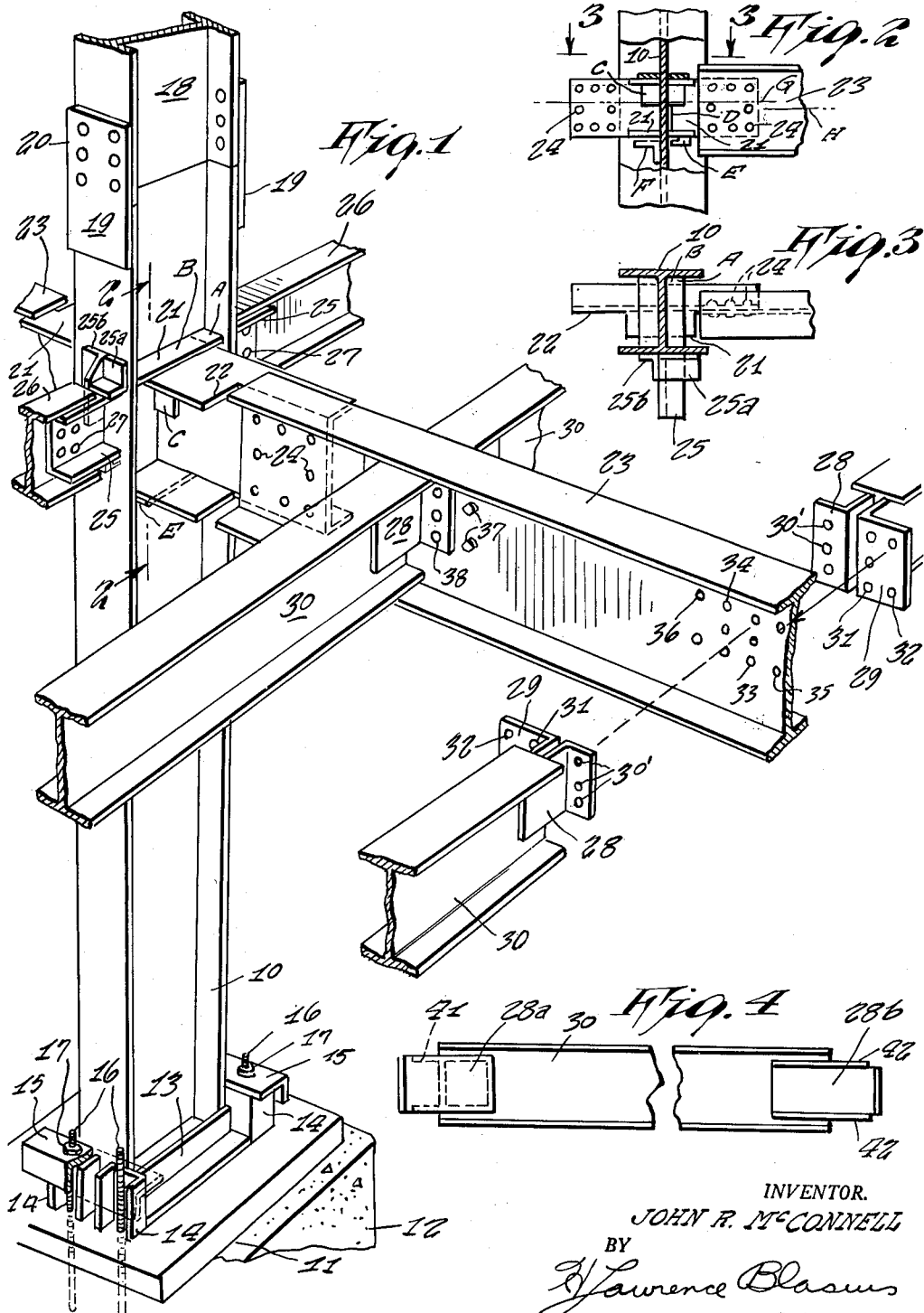
INVENTOR.
JOHN R. McCONNELL
BY
Lawrence Blasus
AGENT

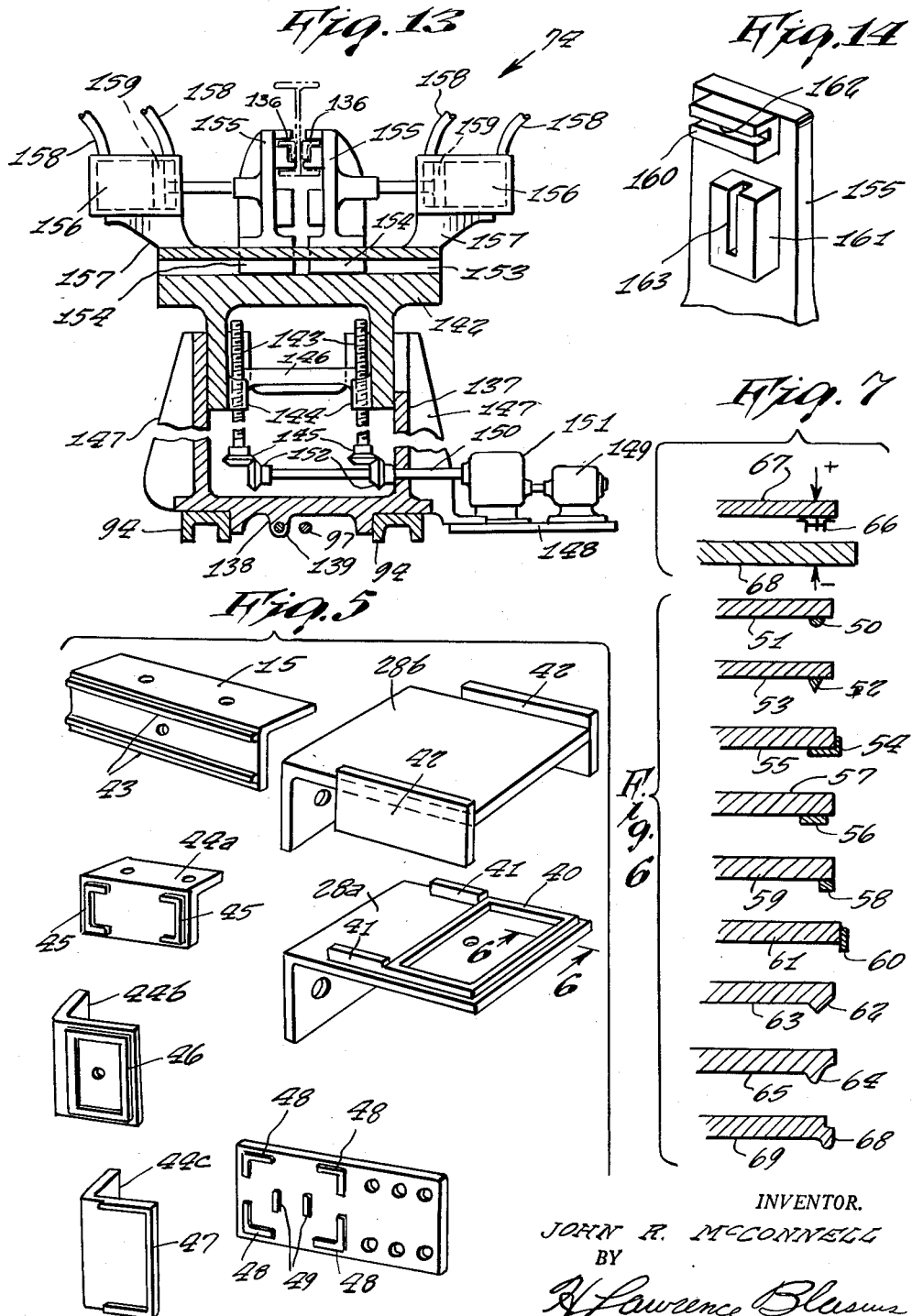

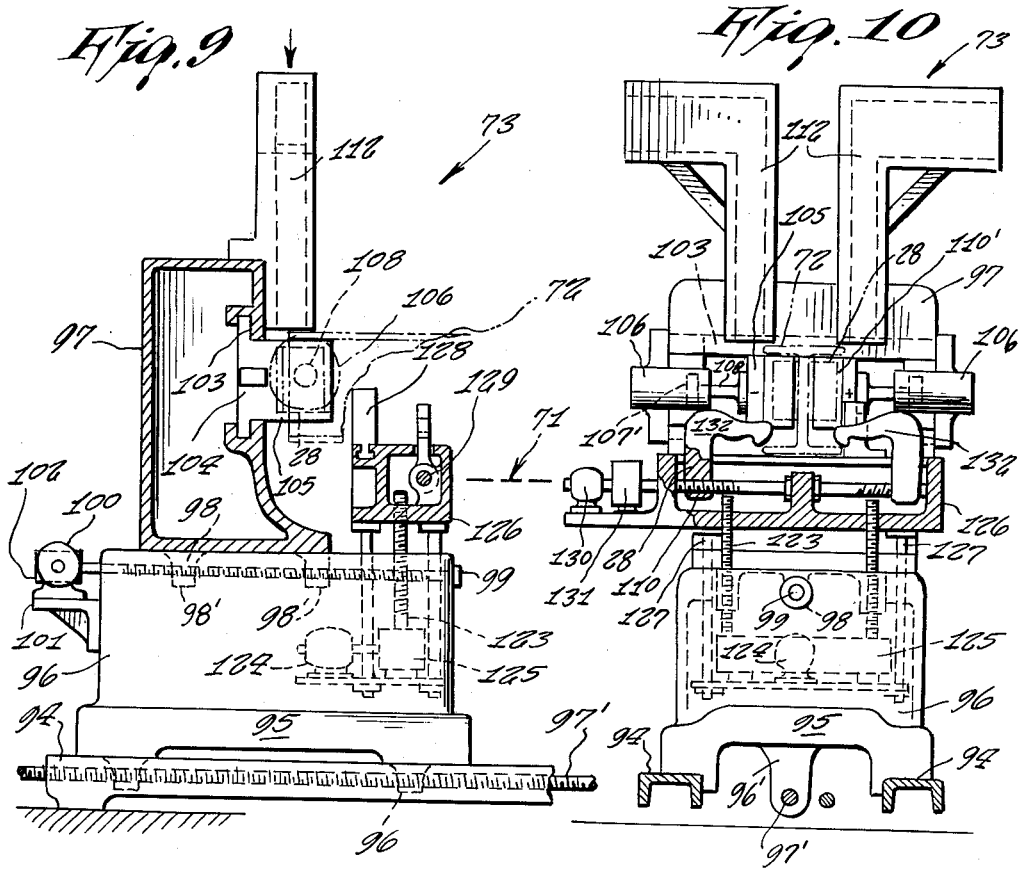
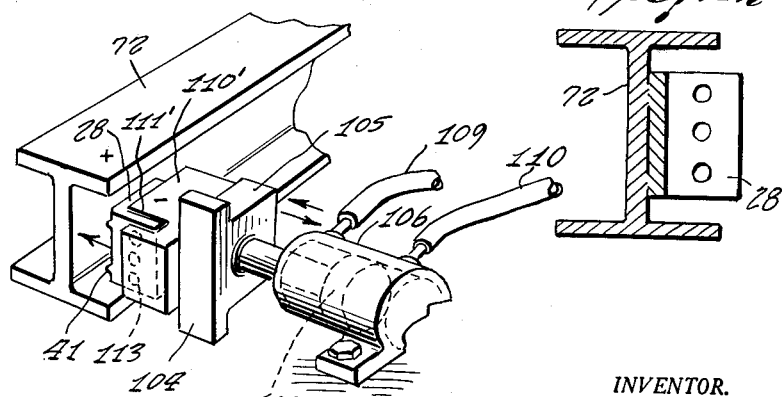

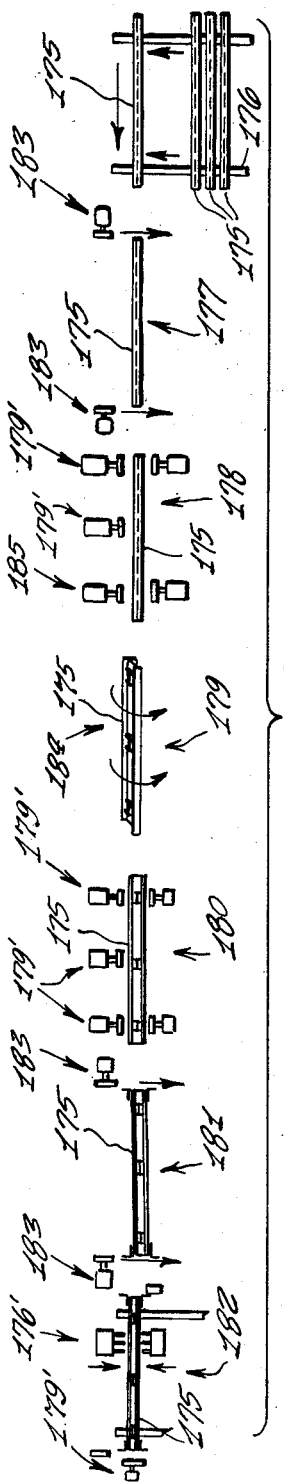
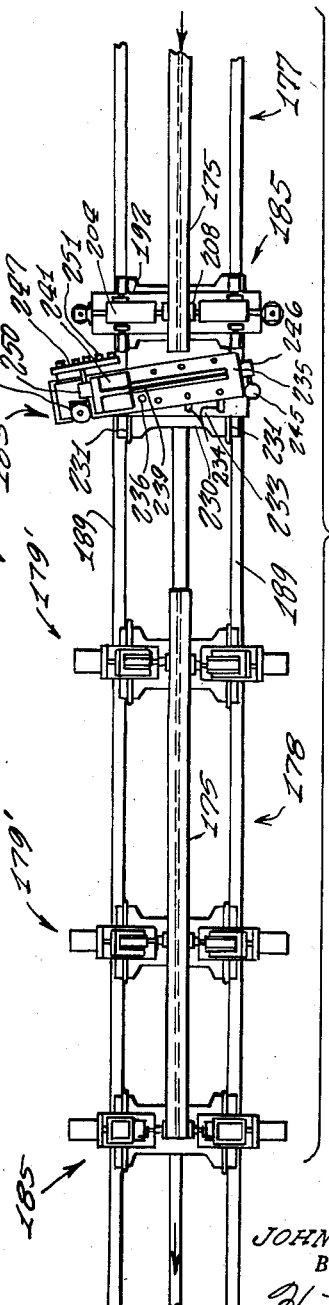
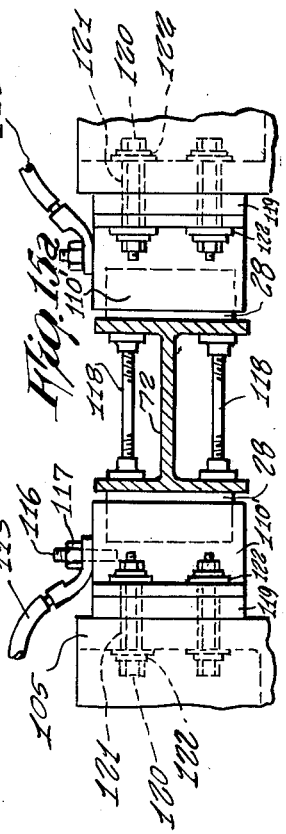
INVENTOR.
JOHN R. McCONNELL
BY
Lawrence Blasus
AGENT April 9, 1963 J. R. McCONNELL 3,085,148
WELDING MACHINE FOR CONNECTING STRUCTURAL
DETAILS TO STRUCTURAL STEEL MEMBERS
Filed Feb. 6, 1956 8 Sheets-Sheet 6

Fig. 18

INVENTOR.
JOHN R. McCONNELL
BY
H. Lawrence Blasus
AGENT

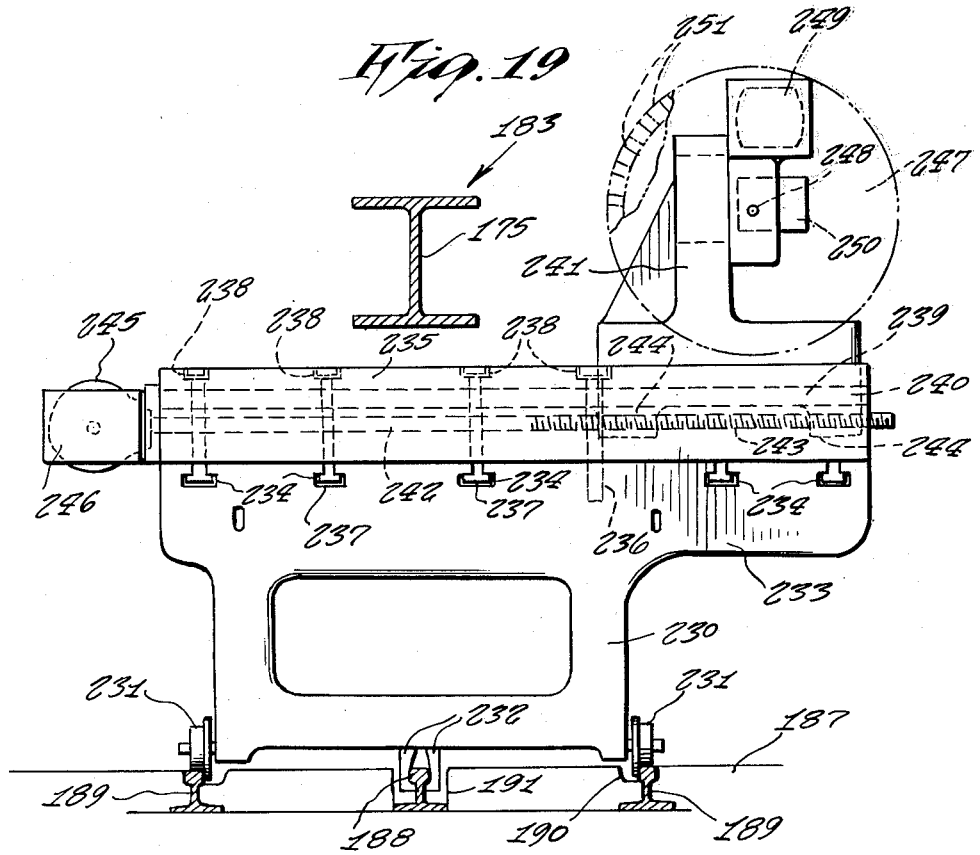
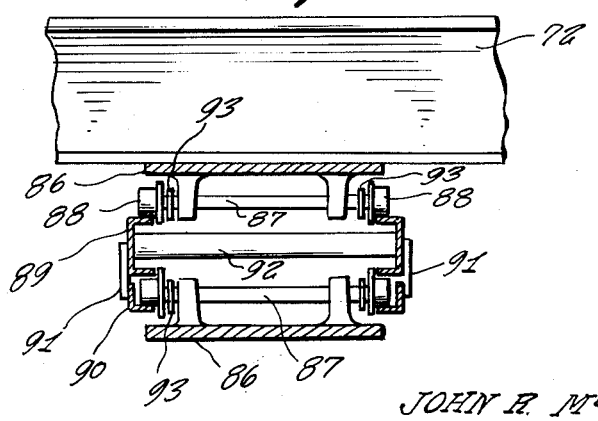

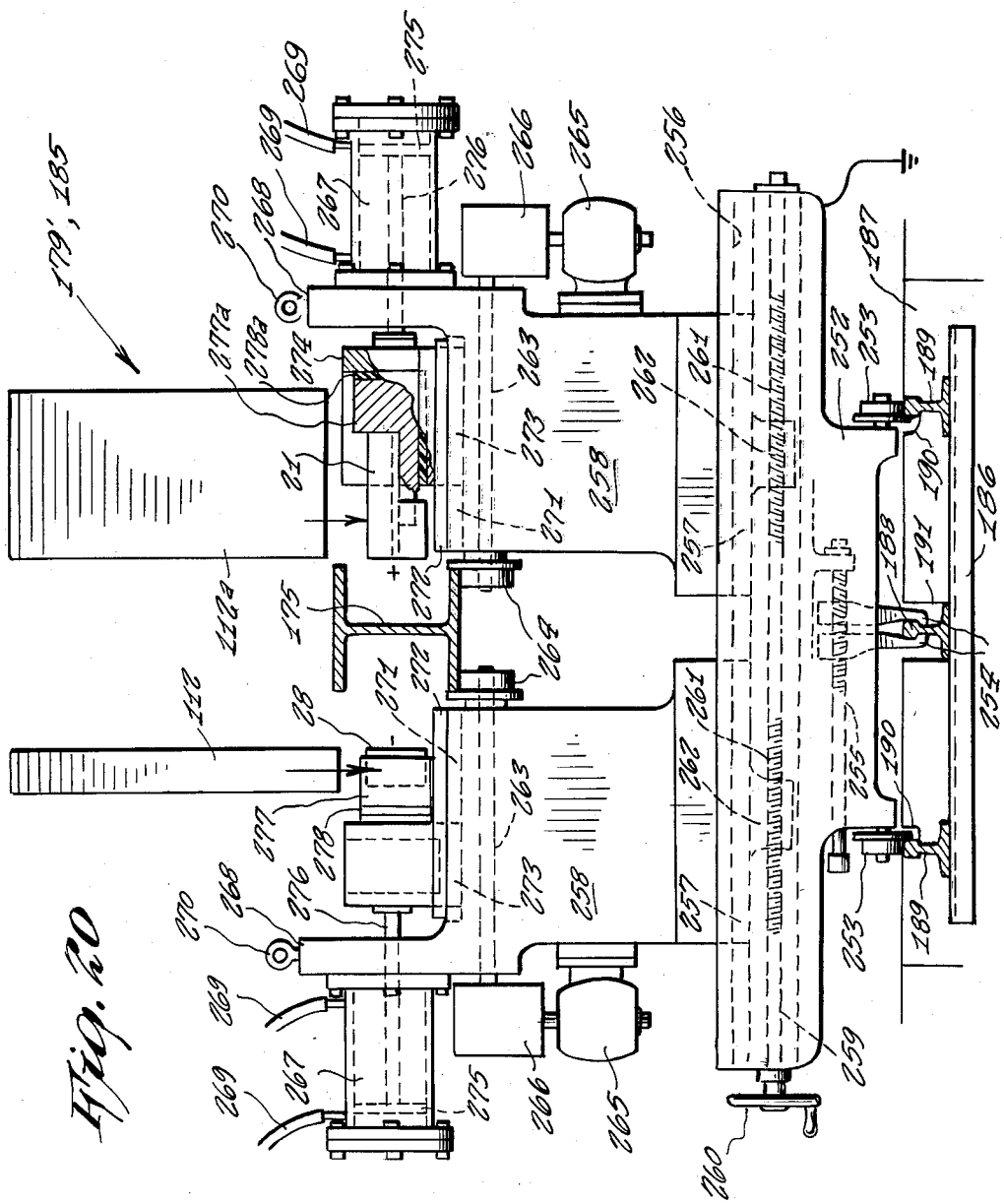

United States Patent Office 3,085,148
Patented Apr. 9, 1963

3,085,148
WELDING MACHINE FOR CONNECTING STRUCTURAL DETAILS TO STRUCTURAL STEEL MEMBERS
John R. McConnell, 148 Woodside Ave., Ridgewood, N.J.
Filed Feb. 6, 1956, Ser. No. 563,662
12 Claims. (Cl. 219—139)

This invention relates to the fabricating and erecting of structural steel.

It is an object of the present invention to improve the methods of the fabrication and erection of structural steel. The present invention proposes to do this by better design of details, the use of a new method of welding beads, the most economical combination of punching and welding in the shop, by limiting the number and types of operations on and handling of main member material in the shop, concentration of multiple operations on details, the use of new types of automatic machines in which welding is the principal operation, and the employment of the production line technique of continuing material travel, momentarily arrested in stages, for progressive, complementary processing operations and the addition, assembling and securing of parts to completion.

Excluding plate, tank, vessel, boiler and ship work, the vast bulk of steel work that is fabricated and sent out to the field for erection consists of comparatively long, slender, straight members of constant cross-section. These features adapt this work to the production line technique of progressive work stations with longitudinal material travel by roller propulsion which comprises the present invention.

It is another object of the present invention to provide greater economy, a stronger job, greater accuracy, speed and efficiency in the fabrication and erection of structural steel.

For other objects and a better understanding of the invention, reference may be had to the following detailed description taken in connection with the accompanying drawing, in which:

FIGURE 1 is a fragmentary perspective view of a structural steel assembly embodying the features of the present invention;

FIG. 2 is a fragmentary vertical sectional view shown partly in elevation taken along the line 2—2 of FIG. 1;

FIG. 3 is a fragmentary transverse sectional view taken along the line 3—3 of FIG. 2;

FIG. 4 is a side elevational view of a floor beam fabricated according to the present invention;

FIG. 5 is an exposed perspective view of a plurality of connecting angles and splice plates illustrating the application thereto of the welding ridges or beads forming a part of the invention;

FIG. 6 is a fragmentary sectional view of a plurality of connecting members showing the various types of applied and formed welding ridges or beads;

FIG. 7 is a fragmentary sectional view of a still further modified form of welding ridge or bead just prior to welding to a structural member;

FIG. 8 is a top plan view of a transverse feed beam and girder welding machine for carrying out the method of the invention;

FIG. 9 is a vertical sectional view of one of the end welding machines of FIG. 8 shown partly in elevation;

FIG. 10 is an end elevational view thereof looking from the right of FIG. 9 and shown partly in section;

FIG. 11 is a fragmentary perspective view of the die block and piston forming a part of the end machines of FIGS. 9 and 10 and showing one of the connecting angles being welded to the end of a beam or girder;

FIG. 12 is a vertical sectional view through the beam or girder showing the connecting angle welded thereto;

FIG. 13 is a transverse sectional view shown partly in elevation of one of the intermediate welding machines of FIG. 8;

FIG. 14 is a fragmentary perspective view of the die block forming a part of the intermediate machine of FIG. 13;

FIG. 14a is a transverse sectional view shown partly in elevation of the chain link conveyors shown in FIG. 8;

FIG. 15 is a side elevational view of a beam or girder after welding thereto of the connecting angles by means of the transverse feed beam and girder welding machine of FIG. 8;

FIG. 15a is an end elevational view shown partly in section of the die blocks forming a part of the welding machines;

FIG. 16 is a diagrammatic view illustrating the longitudinal feed method and apparatus forming another part of the invention;

FIG. 17 is a top plan view of the longitudinal feed welding machine of FIG. 16;

FIG. 18 is an end elevational view shown partly in section of the propulsion and hold down machine forming a part of the longitudinal feed machine of FIGS. 16 and 17;

FIG. 19 is an end elevational view of the milling machine forming another part of the longitudinal feed welding machine;

FIG. 20 is an end elevational view of one of the welding machines forming a part of the longitudinal welding machine of FIGS. 16 and 17;

FIG. 21 is a detail end elevational view of the roller mechanism of the machines of FIGS. 18 through 20;

FIG. 22 is a view similar to FIG. 21 of a modified form of roller assembly; and

FIG. 23 is a view similar to FIG. 21 of a still further modified from of roller assembly.

Referring now more in detail to the drawing and more particularly to FIGS. 1 through 3, there is shown a structural sheet assembly embodying the features of the present invention and including the column 10 of I-shaped cross section, substantially as illustrated.

According to the present invention, a rectangular steel billet 11 is shop welded to the lower end of the column 10 and is adapted to rest on the concrete pier 12. The connection of the steel billet 11 to the column 10 is reinforced by the channel or inverted angles 13 shop welded to the adjacent portions of the column and billet, as shown in FIG. 1. Channel irons 14 are shop welded to the billet 11, reinforcement angles 13 and column 10 and support thereon the angle irons 15 which are shop welded thereto. Anchor studs 16 are embedded in the concrete pier 12 and extend upwardly through aligned openings provided in the steel billet 11 and the reinforcement angles 15. Nuts 17 screw threaded onto the upper ends of the studs 16 serve to retain the reinforcement angles 15, column and billet in firm engagement with the pier 12, as will be obvious. Thus, there has been provided an improved means of mounting the column 10.

A second column 18 of I-shaped cross section is mounted on the upper end of the column 10 by means of the splice plates 19, which are shop welded to the flanges of the column 10, and rivets 20, which latter are riveted on the job or in the field. The splice plates 19 are shop welded to the column 10 in an improved manner according to the present invention and to be hereinafter described.

In the further practice of my invention, a pair of wide flange H-column connections 21 are shop welded to the opposite sides of the web portion of the column 10, each of the wide flange H-column connections 21 being provided with the rectangular cutouts 22. As shown in FIGS. 2 and 3, an additional area A is provided in the top flange of the H-column connection 21 by fully welding a plate B to said top flange and to the web and flanges of the column 10. Short, side shear plates C are welded to the web of H—column connection 21 and to the web of column 10. The web of H-column connection 21 slightly cut back, as at D below shear plates C. Lower flange of H-column connection 21 is fully welded to the web of the column. A rabbeted plate E is fully welded to the lower flange of H-column connection 21, set a distance of from 0 to 1/64" clear of the column web, unwelded. Or an L-shaped seat F can be welded to the column web, clearing the lower flange of H-column connection 21 by the same distance as above, not welded thereto.

The same effect is obtained in the channel connection 25 for beam 26 by using two pieces of angle, i.e. shear plates 25b and top reinforcing plate 25a, as shown. The additional advantage of that is that tensile stress in connection is spread gradually out into a perpendicular resisting surface, avoiding a sharply bent stress path with fibre stresses concentrated at surface of corner juncture. Girders 23 are riveted, as at 24, at their web portions to the H-column connections 21 within the cutouts 22 thereof.

Channel connections 25 are shop welded to the flanges of the column 10 in lateral alignment with the H-column connections 21 and serve to mount the floor beams 26 by means of the rivets 27, which latter are riveted on the job or in the field.

In the further practice of my invention the connecting angles 28 and 29 are shop welded to the ends of the floor beams 30. It will be noted that the laterally extending portion of the connecting angle 29 is wider than the corresponding portion of the connecting angle 28. The connecting angle 28 is provided with the vertically-spaced rivet openings 30' while the connecting angle 29 is provided with the vertically-spaced rivet openings 31. The extended portion of the connecting angles 29 are also provided with the vertically-spaced bolt openings 32. The web of the girder 23 is provided with the vertically-spaced rivet openings 33 adapted to be aligned with the rivet openings 30' of connecting angle 28 and laterally-spaced therefrom with a second set of vertically-spaced rivet openings 34 adapted to be aligned with the rivet openings 31 of the connecting angle 29. The web portion of the girder 23 is also provided with the bolt openings 35 adapted to be aligned with the bolt openings 32 of one of the connecting angles 29 and with a second set of bolt openings 36 adapted to be aligned with the bolt openings 32 of the other connecting angle 29. Thus, the floor beams 30 are temporarily connected to the girder 23 by means of the bolts which pass through the aligned openings 35, 36 in the girder and the bolt openings 32 in the connecting angles 29, after which the rivets 38 are riveted on the job in the aligned openings 30', 31 of the connecting angles 28, 29 and the rivet openings 33 and 34 of the girder. The connecting angles 28 and 29 are shop welded to the floor beams 30 by the improved welding method of the present invention to be hereinafter described.

It will be apparent from the foregoing that the structural assembly of FIG. 1 has been effected with a minimum of field operations, with the maximum amount of welding being performed in the shop on the prefabricated structural steel members 10 and 30. Thus, the only field-operations required are the rivets, 24, 27, and 38, along with the positioning of the bolts and the nuts 17. Thus, a great economy of labor is effected in the field.

As shown in FIG. 5, the connecting angles 28, 29 and splice plates 19 are formed with welding ridges or beads in the further practice of the present invention. For example, the connecting angle 28a is provided with a rectangular welding ridge 40 and a pair of extended ridges 41 at opposite sides, the ridges 41 being slightly higher than the ridges 40. Or, the connecting angle 28b may be provided along the opposite edges thereof with the reinforcing flanges 42 which extend beyond the connecting angle in the form of complementary welding ridges. Or, the reinforcing angles 15 may be provided with the parallel, laterally-spaced, longitudinally-extending ridges 43.

Or, the intermediate connecting angles 44a may be provided with the C-shaped welding ridges or beads 45 at opposite ends. Or, the intermediate connecting angles 44b may be provided with the welding ridges or beads 46 of rectangular configuration. Or, the intermediate connecting angle 44c may be provided with the C-shaped peripheral welding ridge or bead 47. And again, the splice plate 19 may be provided with the L-shaped, rectangularly-arranged welding ridges 48 plus the two central ridges 49, substantially as illustrated.

As shown in FIG. 6, the welding ridges or beads may be of various geometric shapes in cross-section and may be either formed in the connecting angles or splice plates or applied. Thus, the ridge 50 applied to the plate 51 is of semicircular cross-section. The ridge 52 applied to the plate 53 is of triangular cross-section. The ridge 54 applied to the plate 55 is of L-shaped cross-section. The ridge 56 applied to the plate 57 is of rectangular cross-section. The ridge 58 applied to the plate 59, of square cross-section. The ridge 60 of rectangular cross section is applied to the edge of the plate 61. Or, the ridge 62 of triangular cross section is integrally formed in the plate 63. A ridge 64 of semicircular cross section is integrally formed in the plate 65. Or, as shown in FIG. 7, the wire mesh ridges 66 may be applied to the plate 67 for welded connection to the member 68. Finally, as shown in FIG. 6, a ridge 68 integrally formed along one edge of the plate 69 may be provided extending outwardly and downwardly therefrom. It will be readily understood that the wire mesh ridges 66 may be of any cross section, for example H cross section, X cross section, HH, as well as any other variations. The wire ridges 66 have the advantage in concentrating more heat over a smaller area during the welding process.

It will be apparent from the foregoing that the welding ridges or bead s, may be of any configuration or cross section and may be either applied to the details or connecting angles or integrally formed therein.

The welding ridges or beads of FIGS. 5 and 6 may be either formed or applied on one or both of the contacting surfaces of the parts to be welded together by the flash-resistance-pressure method, the contact-resistance-pressure method, or variations of these. The projections may be isolated areas, intermittent ridges, or continuous ridges of pattern as required. The projections would be of suitable fusible metal, deposited on and fused to a contact surface by one of the several alternate methods outlined below, in the case of the applied welding ridges or beads. The surfaces would then be forcibly pressed together with a welding current of suitable characteristics applied thereto and a flash, or contact-resistance, weld would be effected. These projections would localize and limit the weld areas.

By the first method of welding the applied projecting welding ridges or beads, a continuous electrode with electric current would be continuously applied to the metal surface and moved along in the area or the pattern wanted at the proper speed, depositing and welding the fusible metal to the surface to the height and width required. As an alternate method of applying the projecting welding ridges or beads to the contacting surfaces, strips, continuous lengths, rings, or frames of light round, square, rectangular, triangular, diamond or other specially designed cross section metal bars or wires would be intermittently tack welded or stitch welded to the stated surfaces in the required pattern. The composition of the metal and its shape, size and volume would be specially suited to the particular operation with varying voltage, current, pressure, time, strength and other factors as required and depending on whether flash pressure or contact-pressure resistance welding methods were employed. It is a still further method of application, on certain types of work, the above mentioned strips, lengths or frames, or small areas of flat, deformed, indented or cupped metal plate would be inserted loose between the contacting surfaces of the pieces to be welded together and pressure and current applied for the welding. An alternate would be that the small areas mentioned above might be pre-welded to one of the contacting surfaces to be welded together. Or, a stencil (with thin ties) of insulating or non-conducting material of the pattern wanted, of the correct thickness, with holes or slots of the correct-cross section would be placed on the back of the detail or other metal surface. Granulated iron or other fusing metal would then be deposited over the stencil with the excess being brushed off by a blade, whereupon an electrode head would be brought down over the stencil containing the granules, and current applied to fuse the granulated metal or flux to the detail or other surface. The detail would form the opposite electrode. The upper di-electrode would have a raised (projecting) pattern to slightly project into the pattern to intensify deposition for contact-pressure weld. Flush or sunk pattern die would produce a bead of lesser density and conductance, that in later operation would produce greater heat, i.e., flash-resistance weld.

As a still further method, the use of projecting edges of the flange plates of connecting angles (connecting angle 28b, FIG. 5) could be used as applied projecting welding ridges.

Regarding the formed or integral projecting welding ridges or beads, they would be formed of the parent material in or on the connection detail or other piece by the following methods:

By casting of hot fluid metal and alloys in suitable molds or forms to the pattern desired. This includes pouring into sand and similar molds and die casting in metal molds. The metals used would be malleable and ductile, or made malleable in later processing.

By forming of the metal piece or detail in the (hot) drop forging process with suitable dies.

By the forming of edge ridges or beads by the cold-percussion forming process or caulking, peening, or edge sinkage.

By the forming of edge ridges or beads and small sunken interior areas by the use to the (welding or cutting) melting torch. The metal worked on would be placed on and centered over a surface containing the required pattern or grooves and the torches would be automatically guided in the required pattern. The torches would melt the detail material down into the ridge forming grooves, creating the welding beads. The working table surface would be crucible material or a water-cooled high melting point metal or alloy of considerable mass and bulk. Pressure, with rams, dies and boundry dies may be employed with heat.

In the foregoing description, the beads and the machines are applied to the securing of connection details to the principal, or individual members. The method can also be applied to the assembling and securing and uniting of component parts of principal members such as plate girders, trusses, columns with cover plates, latticed columns, other latticed, trussed or braced members, construction units, prefabricated sections, complete assemblies, and all other metal work to be joined or connected. It will be apparent that the principles, designs, layouts and actions on the machines to be described can be adapted and applied to other types of work.

In the further practice of my invention, I claim as novel the construction of the details in connecting members of FIG. 1. For example, the connecting angles 28a and 28b (FIG. 4) for effecting an economy by eliminating the coping of the floor beams. Also, as shown in FIG. 1, the conception of providing the connecting angles 28 and 29 with laterally extending portions of different width on opposite sides of the girder 23 (and the wide portions extending in opposite directions) with the outer rows of holes only used for erection bolts. By this construction, floor beams, framing opposite into a girder can be erected separately without interference or disengaging the bolts.

Also, the wide flange H-column connection 21 (FIG. 1) butt welded to the column 10 web provides a semi-rigid connection for the girder or beam 23. With the girders or beams 23 riveted or welded to these wide flange H-column sections, a partially continuous beam effect is economically obtained throughout the building frame. It will also be noted that the girder flanges do not have to be punched, thus saving two operations. Among the additional advantages are added stiffness and strength and the economy of material not needed. Also, it will be noted that the girder 23 may be swung in sideways without the danger of dropping it down into the trough of the column. The use of more material at the upper flange of connection 21 fixes the neutral axis G (or center of gravity) of the connection above mid-height H. Therefore, the tension fibre stress per square inch is considerably less than the compression at the lower flange. As the load comes on the girder, it deflects, causing slight deformation of joint. As load increases, larger deformation occurs at the lower flange of connection joint. Before the working stress is reached, the additional area of rabbeted plate G or seat F comes into play, automatically causing a lowering of the neutral axis, a decrease of the average unit compressive stress and an increase of unit tensile stress within reasonable limits. Thus, a flexible joint (semi-rigid connection) is gradually achieved with a minimization of the dangerous tendency of the tension flange to tear. Action is positive, rather than action depending wholly on a component of the connection to pass yield point of material, for its functioning.

Also, the column to base plate connection of FIG. 1 will provide added strength and stability and overcome the objection of welding a heavy base plate to a thinner column section. Using flash-pressure-resistance machine welding, after pre-heating, as below the butt to surface weld will assure the full strength of the column section in the weld. The details could be hand welded on, as a continuing operation, as the sections come off the rolls onto the shipping conveyor.

Heavy base plates would first be pre-heated by an enlarged pattern face contacting, or outline contacting, pierced split sleeve type electrode die, using electric resistance to supply the necessary additional heat. With the former, after heating, the pre-heat die would be hinged down or retracted sideways, as base plate moves forward to column end for resistance weld. With the latter, column would move through retained die to be welded after pre-heating is effected. Polarities would be altered if and as necessary and die would be split and removed as previously just as, or before, weld is completed. This technique may be applied to other similar problems.

Referring to FIGURE 16, left hand end, the typical piston and ram with die-fixture holding the base plate in a vertical position is shown on the center line of the machine layout at extreme left hand end on a mobile track mounted carrier-base 179'. Above and slightly to the right is shown the carriage base that is rotatably mounted on tracks normal to main tracks of layout and crossing same. Said carriage-base carries a projecting vertical face pre-heating die with the electrically connected projecting contact face, facing to the left.

On main tracks of layout, detailed as 177 in FIG. 17 and 189 in FIG. 20, the shape or member 175 is propelled into position at the station 182 and supported above said tracks 177 by rollers 264 of FIG. 20. General fabricator and welder 185 of FIG. 20 is fitted with transverse horizontal electrode clamping jaws on carrier-rams 274 to lock the shape in position and to provide one leg of the welding circuit for resistance welding of base plate to column end after preheating. The column illustrated in FIG. 1 although restricted, by space, to 1 story in height and with different details, shows the welded base plate.

The pre-heating die on carriage-base is forwarded to the centre line of main track against a pre-set stop, with the projecting preheating die facing to the left. Carrier base 179' carrying the base plate vertically held in a projecting fixture-die transverse to the main track is propelled forward to contact the preheating die. After being brought close to a welding temperature, carrier 179' is slightly retracted as pre-heating carriage base is retracted from athwart main track. Carrier base 179' is then forwarded against the foot of the clamped column as plus leg of welding circuit is energized to impress required voltage across base plate to column and to clamping electrode mounted on the rams of general fabricator and welder 185. Polarities may be reversed as required; dies may be sectionalized and used with sequence welding; and carbon face patterned dies may be employed and alternating current may be used to equalize generation of heat in contacting parts. On completion, 179' is retracted, the column clamps released, and the completed column is discharged transversely on conveyor belts 176.

Main structural shape is pre-heated by forwarding the empty die blocks against the shape or close to the shape allowing a sparking-resistance gap and impressing an alternating or periodically-reversed-polarity, direct current across the main member through the die-blocks. Alternately, multiple-orifice oxy-acetylene gas ports in the die blocks may be used on very heavy sections for gas flame surface pre-heating. After member is brought near a welding temperature die blocks are retracted, are filled with the connection pieces, advanced to the shape and a series-circuit current is impressed across the three contacting pieces of metal involving two welds; creating a series circuit, transverse, compound, chain, resistance-forge weld.

The above details will be previously prepared in jigs, fixtures and semi-automatic machines by various manufacturing processes, such as drop forging and casting.

The present invention will also contemplate the use of automatic machines for welding the aforesaid details to the main members, employing the above mentioned welding ridges or beads. For example, in FIG. 8, there is illustrated a top plan view of a transverse feed beam and girder welding machine indicated generally at 70 and including the roller chain link conveyors 71 adapted to move thereon the beam and girders 72 towards the transverse end welding machines indicated generally at 73 and the transverse intermediate welding machines indicated generally at 74. These roller chain link conveyors are driven by the motor 75 having the drive shaft 76 in operative engagement with the worm and worm gear reducer 77 which in turn drives the driven shafts 78 which in turn drive the roller chain link conveyors through the driven rollers 79 (FIG. 8).

The chain link conveyors 71 are supported on the anchorages 80 which in turn are adjustable laterally on the tracks 81 by means of the left and right hand threaded studs 82 which are driven through the worm and worm gear reducer 83 from the drive shaft 84 of motor 85. The lateral distance between the chain link conveyors 71 will be adjusted for beams of varying lengths as will be obvious. Thus, the girders and beams 72 will be fed in the direction of the arrow of FIG. 8 towards the end and intermediate transverse welding machines 73 and 74 to be hereinafter described more in detail.

In FIG. 8, although only a single transverse station is shown it is apparent there may be a plurality of transverse stations for a series of progressing, complementary, processing (fabricating) operations.

Mechanical punches may be substituted for the end welders where required. Also triple multiple drill heads set in a U pattern operating toward a common centre may be substituted to drill both flanges and the web simultaneously for moment connections.

As shown in FIG. 14a, the roller chain link conveyor 71 includes the separable supporting plates 86 on the inner surfaces of which are journalled the shaft 87 which terminate in the rollers 88 which are supported on the tracks 89 and 90, the tracks 89 and 90 being connected together in vertically-spaced relationship by means of the straps 91 which latter are in turn mounted and supported by the anchorages 80. The tracks 89 are connected by the transverse braces 92, while the shafts 87 are connected together by the links 93.

Referring now particularly to FIGURES 9 through 11, there is shown a transverse, end welding, fabricating unit embodying the features of the present invention.

In FIGURE 8 these twin, opposite hand, simultaneous acting, end fabricating units 73 shown in detail in FIGURES 9 and 10, are located symmetrically about the mid-length bed 94 anchorage 141, with electrically interlocked, opposed carriage mechanisms 97 matched for speed, thrust, and travel using reversible constant speed motors 100. In each unit a base 95 is slidably mounted on the track-bed or ways 94 and carries depending lugs 96, through which are screw threaded the externally threaded stud 97 for adjusting the longitudinal positions of the bases 95, which by means of a pointer attached to base precisely measures the finished overall length of the completed beams or girders on a doubled scale attached to bed 94 with zero at centre anchor 141 this adjustment being effected (FIGURE 8) by means of a motor 98 which drives the stud 97. The opposite ends of the stud 97 are threaded in opposite directions so as to either converge or diverge the opposite hand, opposed end machines 73 equally towards or away from lengthwise fixed, shaft anchorage at mid length of bed or ways 141. The base 95 integrally formed with the hollow rectangular upper portion 96 which slidably mounts thereon the carriage 97 for the lengthwise moving of shape 72 to length centre same on mid-length bed anchorage and for retracting welding mechanism to allow shape to pass by on completion of welding operation. The carriage 97 is adjusted relative to the seat 95 by means of depending lugs 98 through which is screw threaded the externally threaded stud 99, which latter is driven by the motor 100 which is in turn mounted on the angle bracket 101 suitably secured to the outer end of the casing 96 (FIG. 9). The motor 100 is provided with a gear reducer 102, as will be obvious. The inner face of the carriage 97 is formed with the T-slot 103 within which slide laterally the T 104 integrally formed in the ram 105 (FIG. 11), one such T and ram being provided at both sides of the T-slot 103. The rams 105 are actuated toward and away from each other by means of the cylinders 106, pistons 107 and piston rods 108, the cylinders 106 being provided with the fluid pressure lines 109 and 110, as will be obvious. A bumper lug is provided on the end of one ram with a matching recess in the opposite ram.

As shown in FIGS. 8 and 10, the cylinders 106 are suitably mounted on the bracket 107' fixedly carried and extending outwardly from opposite sides of the carriage 97.

A die block 110' of a high melting point and electrically conductive material is fixedly mounted on the inner faces of each of the rams 105 and is provided with the inwardly extending slot 111' which terminates above the bottom of the die block and is adapted to support therewithin a connecting angle 28 provided with the welding ridges 41 fed into the die block by gravity from the magazine 112 suitably mounted on the top of the carriage 97, a magazine 112 being provided on each side of the carriage (FIG. 10). It will be noted that by means of the slot 111' the die block supports both sides and the bottom edge of the connecting angle 28 (FIG. 11).

The die block 110' is provided with the knurled spring detents 113 (FIG. 11) which press heavily against the inside face of the connection angle 28 to retain same within the slot 111' until welded to the beam or girder 72.

Voltage is applied across the assembled pieces after the die blocks press the connection angles against the opposite sides of the web of the shape. Although FIG. 15a shows two seat or base angles being welded to the opposite flanges of a column the general principles, arrangement and practice are similar to the welding unit of FIGS. 9 and 10. In FIG. 15a voltage is applied after the seat or cap angles 28 are in position against the flanges of the beam or girder 72 by means of the cables 115 connected to the terminal posts 116 carried by the die blocks 110', the terminal posts 116 mounted in the die blocks and being externally threaded to receive thereon the terminal nuts 117. For welding to opposite flanges only, for columns and similar work, conductant jacks 118 may be positioned intermediate the flanges of the beam or girder 72 to equally distribute the flow of current along the flanges and the seat or cap angles 28. Suitable means will be provided for preventing the flow of electricity away from the die blocks, connecting angles and members. For example, as shown in FIGURE 15a, insulation plate 119 may be positioned intermediate the die block and the ram, being secured thereat by the nut and bolt assemblies 120 which serve to secure the ram, die block and insulation plate together. An insulation sleeve 121 surrounds the nut and bolt assembly 120 and insulation washers 122 are provided at the opposite ends thereof, substantially as illustrated.

As shown in FIGURES 9 and 10 means are provided for stopping the transverse movement of the shape 72 when it arrives intermediate the end welding units 73 as well as means for holding down the beams and girders during the welding operation. For this purpose, an externally threaded stud 123 extends upwardly at opposite sides of the casing 96, being driven by a motor 124 through a gear box 125. The motion of the studs 123 serves to raise and lower an elevating and hold down casing 126 which is slidably mounted on the pillars 127 which are mounted within the casing 96. The outer end of the hold down casing 126 mounts the stop 128 which automatically stops the shape 72 and actuates motor 124 to raise shape upwardly on the upper surface of the casing 126 above the level of the chain link conveyor 71 (FIG. 9). A transverse externally threaded stud 129 is journalled in the casing 126, being driven by a motor 130 through a gear box 131. A pair of laterally adjustable hold down members of substantially hook shape 132 are screw threaded on to the opposite sides of the stud 129 and upon inward movement thereof are adapted to engage the lower flange of the girder 72 upon operation of the reversible motor 130. The motors 100, 124 and 130 are all reversible.

In operation; with the welding carriages diverged to extreme outward positions on bases, the transversely moving shapes 72 will contact the stop 128 which will automatically stop the beam or girder intermediate the end machines 73. Suitable switch means will be provided for the stop 128 and actuated by the contact with the girder 72 it will automatically start the reversible motor 124 to raise the beam or girder 72 above the level of the chain link conveyor 71 to the working level of the die blocks 110 and to simultaneously stop the motor 75 of the link conveyor. The position of the bases 95 will first have been set by means of the motor 98 (FIG. 8) to the precise overall length of the finished member that is to be produced. A vernier indicator attached to each base 95 will indicate on twin, outwardly extending, doubled length, scales with zero at mid-length of bed anchorage 141 the precise distance between operating centres of the twin opposed bases. Each carriage 97 will have a projecting positioning lug on the side for contact with a projectable stop arm located vertically, exactly over indicator on base 95. Outermost surface of slot 111' in die-block 110' (FIG. 11) will be precisely lined up vertically with the contact face of positioning lug on side of carriage. Thus the distance measured over the outside faces of the connection angles 28 being welded to shape 72 will be the same as the distance between operating centre lines of bases 95 which is the overall length of finished member. This distance will also be that, measured on the bed scale under vernier indicator of each base.

With stop arms of bases 95 retracted, diverged carriages are simultaneously and equally converged towards mid-length anchorage 141, by motors 100, beyond their welding positions at stop arms. Underlength shape 72 which is usually somewhat off centre is moved by bumper on tee and 104 of ram 105 of nearest carriage 97 until other end of shape 72 contacts the opposing bumper on opposite ram 104, and 105 which stalls motors 100 and cuts off the motor current. Shape 72 thus length centered is then locked by the reversible motor 130 bringing the hold down fingers 132 into engagement with the lower flange and web of the shape 72.

Carriages 97 are then equally diverged till positioning lugs on carriage 97 sides contact raised stop arms on base 95 sides; when bases 95, carriages 97, and die blocks 110' are in related welding positions. If shape 72 requires pre-heating, raised pattern, carbon-faced, empty dies 110' are forwarded close to web for a periodically reversed polarity, direct current passage, across blocks 110' and through shape 72 with gaps effecting a flash heating operation; or ports around perimeter of raised pattern preheat shape 72 by ignited oxy-acetylene or other mixed gases. Dies 110' are then withdrawn and filled with connection angles 28 from overhead magazines 112. The pistons 107 are then operated to ram the die 110' held, connection angles 28 against the opposite sides of the web at ends of shape 72 as shown in phantom in FIGS. 9 and 10 whereupon the current will be applied to effect an electric resistance, forge weld using raised face dies 110' for spot welding or projection welding with created raised localized projection areas on backs of connection angles 28. Said weld will be a series circuit, compound, chain weld through and across die block-welding heads 110' and the three pieces of contacting steel 72 and 28.

On completion of weld pistons 107 in cylinders 106 retract empty dies 110' hold down fingers 132 are released by actuation of motor 130, as motor 124 lowers hold-down casing 126 and shape 72 to the steel pad conveyor belt 71. Motors 100 simultaneously retract carriages 97 equally to their extreme outward positions with the stop arms on bases lowered. Actuation of motor 75 moves conveyor belt 71, carrying completed member on to discharge position and bringing the next raw shape 72 into processing positioning above bed 94 in line with welding units 73 for repetition of process on new shape 72. Suitable automatic interlocking mechanisms and controls not shown will be provided for effecting the above sequence of operations of the motors and cylinders. Such controls are well known to those skilled in the art and will not, therefore, be described in detail. The cycle of operations is then repeated on the next beam or girder, and so forth.

Although FIGURES 9 and 10 show the preferred embodiment of the machine, an elemental concept of this apparatus combines the base and carriage into a one piece, integral, supporting base simplifying the entire mechanism. With die blocks 110' converged the symmetrical longitudinal converging of end bases 95 by powered shaft 97 may be employed to move and length centre the structural shape 72 between end fabricating units 73. Said bases and dies act as opposed converging bumpers.

During the aforesaid cycle of operations, the intermediate machines 74 will also weld connecting angles 135 and 136 to the intermediate section of the web or girder. The operation of these machines is shown in FIGS. 13 and 14. These intermediate connecting angles 135 and 136 which it is desired to weld to the web are illustrated in FIG. 15. As shown in FIG. 13, a seat 137 is slidably mounted on the tracks 94, its longitudinal position being controlled by means of the depending lugs 138 through which are screw threaded an intermediate lead screw 139 provided at opposite ends with right and left hand threads and which is driven (FIG. 8) by the motor 140. The lead screws 139 and 97 are provided with anchor bearings 141 (FIG. 8). The base 137 is open at the top and slidably mounts therewithin for vertical movement the carriage 142 (FIG. 13). This vertical movement is effected by means of the externally threaded studs 143 which are screw threaded through inwardly extending portions 144 of the carriage 142, bevel gears 145 being provided at the lower ends of the studs 143. A transverse brace 146 extends across the interior of the carriage 142. The base 137 is provided with the reinforcing webs 147, one of which supports a base plate 148 on which is mounted the motor 149 which drives the transverse shaft 150 through a gear case 151. Bevel gears 152 are keyed to the shaft 150 and are in mesh with the bevel gears 145 whereby to drive the studs 143 and to raise and lower the carriage 142 upon operation of motor 149. The upper surface of the carrier 142 is provided with the T-slot 153 which slidably mounts therewithin the T-shaped portions 154 carried by the oppositely disposed rams 155. The rams 155 are actuated by the cylinders 156 which are mounted on the brackets 157 which extend outwardly from opposite sides of the carrier 153, the cylinders 156 including the usual fluid lines 158 disposed on opposite sides of the piston 159. As shown in FIG. 14, a pair of vertically spaced die blocks 160 and 161 are mounted on the inner faces of the rams 155, the die block 160 being provided with a horizontal slot 162 which receives therewithin the connecting angle 136 (FIG. 15) while the die block 161 is provided with the vertical slot 163 which receives therewithin the connecting angle 135. Suitable spring detent means will be provided in the die blocks 160 and 161 for retaining the connecting angles therewithin until welded to the beam or girder.

As shown in FIG. 13, the connecting angle 136 is first welded to the web, whereupon the carriage 142 and die blocks 160, 161 are then raised by means of the motor 149 to position and weld the connecting angle 135, as will be obvious.

The welding technique and insulation mentioned in connection with the end machines 73 will also be provided for the intermediate machine 74.

In operation, the position of the intermediate machine 74 will first be controlled by operation of the motor 140, FIG. 8. The reversible motor 149 will then be strated to raise the carriage and die blocks to the operative position of FIG. 13. It will be noted that the beam or girder will be positioned and held down by the end machines during these operations. The pistons 156 will then be actuated to ram the die blocks and connecting angles 136 against the sides of the web of the beam or girder 72, whereupon the welding will commence. After the first connecting angle 136 has been welded, the motor 149 will again be operated to raise the carriage and die block 160 into operative position to weld the connecting angle 135. The pistons 156 will then be actuated to withdraw the die blocks whereupon the motor 149 will be operated in reverse direction to lower the carriage. Suitable mechanisms and controls, not shown, will be provided for actuating the motor 149 and pistons 156 in a manner similar to the end machines.

Although FIGURE 13 shows the preferred embodiment of the machine, an elemental concept of this apparatus combines the base and carriage into a one piece, integral, supporting base simplifying the entire mechanism. Shapes would be vertically lowered into place or moved longitudinally. This concept would also illustrate the simplification of FIGURE 20, with the propulsion features omitted.

After the welding has been completed and the beams or girders are moved beyond the intermediate and end machines, 74 and 73, respectively, they will move to the end of the chain link conveyor 71 where they will then move longitudinally to the left of FIG. 8 by means of the roller assembly indicated generally at 165. The roller assembly 165, as shown in FIG. 8, includes the idler rollers 166 and driven rollers 167, the rollers 166 and 167 being raised above the level of the link conveyors 71 to remove the beams or girders therefrom and to move them longitudinally towards the rollers 168. The driven rollers 167 are driven by the motors 169 whereby to move the beams or girders longitudinally in the manner described. As they move across the rollers 168, the finished beams or girders are deflected by means of the deflector 170 of conventional design onto the pipe rollers 171 provided with the guards 172 to deliver the finished beams or girders onto a suitable platform, not shown, at the outlet end of the machine. After the beams and girders reach the end location, they are inspected and any patching up or repairs are made and such additional hand welding as is necessary is performed. The beams and girders are then inspected and are ready for shipment to the job.

It will be apparent that compressed air or hydraulic cylinders with pistons can be substituted where motors are shown and vice versa.

The machine shown can be used for any size and length of I-beams or similar shapes, such as channels, which would require certain attachments for stability and upright support. However, the machine would of necessity be employed for the production of material for which there is a large, steady demand.

The die blocks may be changed and relocated to suit the particular size connecting angle being used and are water cooled by suitable means, not shown.

Referring now particularly to FIGS. 16 through 20, there is shown a modified form of the present invention comprising a method and machine for the longitudinal feeding and processing of structural members and which embodies a production line technique, as will hereinafter become clear.

FIG. 16 represents a diagrammatic plan view of the processing of the structural members. As illustrated, the columns 175 are fed from the conveyor 176 moving transversely and are fed longitudinally to and arrested for initial processing at the milling station indicated generally at 177, and then to the welding station indicated generally at 178 where the angles are welded to the web of the column, the column is then rotated at the rotating station 179 where it moves to the second welding station 180 where the connecting angles are welded to the flanges of the column, thence to the milling station 181 where the ends of the angles are milled and finally to the drilling station 182 where any necessary drilling is performed. Also, if the member requires an attached base plate it is preheated by gas or electric resistance here and resistance forge welded to column end. Differential heating of the components by plus polarity and gapped carbon contacts will usually be employed. The member is then transferred to the transverse discharge conveyor 176 for removal.

As shown in FIG. 17, the milling station 177 includes a pair of milling machines indicated generally at 183 to be hereinafter described in detail and a hold down and propulsion machine indicated generally 184 adjacent each of the milling machines. Also, each of the welding stations 178 and 180 includes a pair of welding machines 179' and a pair of welding machines 185 to be hereinafter described in detail.

A rather unusual 2 story column is illustrated to demonstrate the layout's possibilities. The standardized two story column with standard connections and splice plates can also be handled; this requiring only the initial milling to a uniform length, plus the other processing operations.

At each station shape is arrested long enough for the respective fabricating operation to be performed after which it is progressed to the following station where it is similarly arrested.

As shown in FIGS. 18 and 20, the longitudinal machine includes the continuous track tie 186 which is embedded in the concrete supporting surface 187 and on which is mounted the central rail 188 and the outer rails 189. The concrete supporting surface 187 is cut away as at 190 and 191 for a purpose which will hereinafter become clear. The hold down and propulsion machine 184 includes a bed block or base 192 provided with the rollers 193 which ride the rails 189 and to facilitate the movement of the machine to various stages as desired. An externally threaded stud 194 is journalled through one side of the base 192 and has screw threaded thereon a pair of dogs 195 adapted to clamp the center rail 188 upon rotation of the stud 194. The stud 194 is provided with both right and left hand threads whereby to move the dogs 195 in opposite directions and is provided with the external knob 196 for controlling the same. The upper portion of the bed or base 192 is enlarged laterally and has journalled therethrough a transverse stud 197 having the externally threaded portions 198 and 199, the portions 198 and 199 being threaded in opposite directions. The stud 197 is driven by the motor 200 through the gear box 201, the motor 200 being suitably mounted at the side of the bed block 192.

The upper surface of the bed or base 192 is provided with a transverse T-slot 202 which slidably mounts therewithin the T-shaped portions 203 provided at the lower ends of the carriages 204. The carriages 204 are moved toward and away from each other by means of the depending lugs 205 which are screw threaded on to the stud 197.

A pair of oppositely disposed shafts 206 are journalled in the upper ends of the carriages 204 in lateral alignment with each other and mount at their inner ends the complementary rollers 207 adapted to support thereon the structural member or column 175, the rollers 207 having the flange portions 208 which abut the outer edges of the flanges of the column. The shafts 206 are rotated in the same direction by means of a pair of motors 209 suitably mounted at the outer sides of the carriages and which are in operative engagement with the shafts 206 through the gear boxes 210. It will be seen that upon operation of the motors 209, the column 175 or other structural member will be propelled on the rollers 207. It will also be noted that the column may be partially locked in the stationary position by the flanges 208 upon inward movement of the carriages 204 under the action of motor 200. A pair of columns or standards 211 are mounted on opposite sides of each of the carriages 204, being suitably secured at their lower ends to the bed or base 192 and being connected at their upper ends by the transverse supports 212. A movable transverse support and hold down member 213 is slidably mounted at the opposite ends thereof on each pair of columns 211 and fixedly carries on the undersurface thereof a seat plate 214 adapted to engage the uppermost flange of the column 175. A motor 215 is mounted on each of the transverse supports 212 and serves to drive the vertical studs 216 through the gear boxes 217, the studs 216 being screw threaded through the internally threaded portions 218 integrally formed in the slidable transverse member 213 whereby to raise and lower the latter upon operation of motor 215, as will be obvious. Thus, the seat plate 214 will securely hold down the column 175 in a stationary position in cooperation with the stationary rollers 207 and flanges 208 thereof to permit the column to be welded or milled in a manner which will hereinafter become clear.

In operation, the longitudinal position of the hold down and propulsion machine 184 will first be locked by means of the dogs 195. The hold down and propulsion machines 184 will be provided in pairs and will hold down and propel the opposite ends of the column 175. The motor 200 is then started to move the carriages 204 together until they support thereon at the rollers 207 the opposite ends of the lowermost flange, as shown in FIG. 18. The motor 209 is then operated to propel the column to a central position with respect to the machines, a more accurate centering being provided by means of the fingers 219 mounted on the outer face of one of the carriages 204 of each of the machines 184 by means of the ball joint 220. The fingers 219 are normally retained in an inoperative position by means of the pull rod 220' connected at one end to the finger 219 by means of pin 221 and at the other end to a piston 222 which reciprocates in a cylinder 223. After the column 175 has been positioned on the rollers 207, the fingers 219 are moved to the operative position of FIG. 18 by means of the piston 223 and are then drawn towards each other to accurately center the column therebetween by means of the inwardly curved extension 224 having an arcuate slot 225 within which rides a longitudinally extending adjustable rod 226. The rod 226 will act to draw the now vertical fingers 219 together and to accurately center therebetween the opposite ends of the lowermost flange of the column. The overall length of the rod 226 may be reduced by any suitable means, for example a hand wheel or motor and the ends of the rod adjacent the fingers will be suitably mounted in bearing members which are in turn mounted on the carriages. For example, a fixed collar may be secured to the ends of the rod adjacent the fingers 219 and rotatably mounted intermediate a rod bearing and collar stop. The opposite ends of the rod 226 will be screw threaded in opposite directions so as to move the fingers 219 together and away from each other. Said length centering apparatus may be attached to and used with any other fabricating or processing unit shown in FIG. 16.

After the column 175 has been thus centered, the carriages 204 are moved further together by means of the motor 209 to lock the lower flange of the column between the flanges 208 of the roller. The motor 215 is then actuated to move the seat 214 downwardly into engagement with the upper flange of the column and to completely hold down and lock the position of the latter. After the column has been welded or milled, the above operations are then reversed to release the column and to propel it to the next station. The machine may, of course, be used without the hold down mechanism for sole propulsion purposes.

Thus, the milling station 177 (FIG. 16) will include a pair of hold down and propulsion machines 184 as well as a pair of milling machines 183.

As shown in FIG. 19, each of the milling machines 183 includes a base block 230 which is adapted to ride the tracks 189 by means of the wheels 231 and includes the dogs 232 adapted to engage the center rail 188, in a manner similar to those described in connection with the hold down and propulsion mechanism 184.

The upper end of the base block 230 is enlarged laterally to provide a bed portion 233 in which are arcuate T slots 234 arranged in concentric relationship to each other.

A work table carriage 235 is pivotally mounted on the top of the portion 233 by means of the pivot bolt 236. The carriage 235 is locked in its angularly adjusted position by means of the T bolts 237 depending therefrom and which ride in the T slots 234. The upper ends of the T bolts 237 are provided with hexagonal nuts which are located within the circular recessed portion 238 provided on the upper surface of the carriage 235 whereby to tighten the bolts within the T slots, as will be obvious.

The upper surface of the carriage 235 is provided with a laterally extending T slot 239 which receives therewithin a T-shaped portion 240 integrally formed at the bottom of a milling head carriage 241.

Lateral adjustment of the milling head carriage 241 relative to the carriage 235 is effected by means of a transverse stud 242 journalled to the bed 235 and having an externally threaded portion 243 onto which is screw threaded depending lugs 244 fixedly carried by the T-shaped portion 240. The stud 243 is driven by the motor 245 through the gear case 246. A milling head 247 is rotatably mounted at one side of the carriage 241 on the shaft 248, which latter is driven by the motor 249 through the gear reducer 250. The milling head 247 fixedly carries the angularly spaced cutters 251.

In operation, the position of the milling cutter 183 is first locked by means of the dogs 232, whereupon the desired angulation of the carriage 235 is effected by means of the T bolts 237. Thus, by means of this construction, the ends of the column 175 at the milling station 177 may be milled at right angles or any other angle desired. The lateral movement of the milling head 247 through the work is effected by means of the motor 245, which is reversible. Suitable scales will be provided on the bed portion 233 and work table carriage 235 to provide the accurate desired angulation as well as the length of the milled column.

Thus, the work station 177 will consist of two hold down and propulsion machines 184 and two milling machines 183, as shown in FIG. 17. After milling, the hold down mechanism will release the column and propel the same to the welding station 178 where the angles will be welded to the web of the column.

As shown in FIG. 20, each of the welding machines 179' and 185 includes a bed or base block 252 which is movable along the rails 189 by means of the wheels 253 and is locked in position by means of the dogs 254 controlled by the stud 255 in a manner similar to the hold down and propulsion machine 184. The upper portion of the base block is enlarged laterally and is provided with a T slot 256 which slidably receives therein T-shaped portions 257 integrally formed at their lower ends of the carriages 258 whereby to move the same laterally together and apart. This lateral movement of the carriages 258 is effected by means of a screw 259 provided at one end with the hand wheel 260 and with the threaded portions 261 of opposite direction. Depending lugs 262 are fixedly carried by the T-shaped portions 257 and are screw threaded onto the externally threaded portions 261 of the stud 259 to complete the movement. A pair of laterally aligned shafts 263 are journalled in the upper ends of the carriages and mount thereon the wheels or rollers 264 which are adapted to support thereon the column 175 in a manner similar to the rollers previously described in connection with the hold down machine 184. The shafts 263 are adapted to be driven by the motors 265 suitably mounted at the outer ends of the carriages and which are in operative engagement with the shafts 263 through the worm and worm gear reducers or gear cases 266.

Although a hand wheel 260 has been shown on the screw 259, it will be readily apparent that electric motor means may be substituted therefor.

A pair of centering fingers, not shown, similar to those employed with the propulsion and hold down machine 184 will be provided for centering the column 175 in a similar manner.

A pair of cylinders 267 are suitably mounted on the upwardly extended portions 268 of the carriages 258 and include the usual compressed air inlets and outlets 269. Lifting eyes 270 are provided at the upper ends of the extended portions 268 for relocating the machine into various positions by means of overhead lifting means, not shown. The upper surfaces of the carriages 258 are provided with the T slots 271 formed by the separable plates 272 and which slidably receive therewithin the T keys 273 provided at the lower ends of the rams or angle carriers 274. Each of the cylinders 267 includes a piston 275 which actuates the piston rod 276 connected to the carriers 274 whereby to effect the necessary lateral movement of the same.

The ram carrier 274 at one side fixedly carries a die block 277 in a manner similar to the transverse end welding machine 73 previously described, an insulation plate 278 being provided. The die block 277 is provided with a slot and spring detent similar to the die block 110' of the machine 73 and supports the connecting angle 28, the connecting angle being fed by gravity from the magazine 112.

The right hand ram or angle carrier 274 is provided with a special die block 277a for supporting therewithin the wide flange H-column connection 21 (FIG. 1), an insulation 278a being provided between the ram 274 and the die block 277a. The wide flange H-column connections 21 are gravity fed from the magazine 112a directly above the die block. By means of this construction, the wide flange H-column connections 21 are automatically butt welded to the web of the column 175. Each of the stations 178 and 180 will comprise a pair or more of welding machines 179' and 185 and a pair of idler roller carriages. After moving the H-column 175 from the welding station 178 through the rotating station 179, the welding machines 179' at station 180 will weld connections to the flanges of the column after which the column will move on to the milling station 181 which will mill the ends of the column angles welded to the column and then move on to the final station 182 where the splice plate assembly holes will be drilled by a drilling machine 176' through the flange and the column base plate will be welded by the welding machine unit 179' to column end.

In operation, the position of the welding machines 179' and 185 is locked by means of the dogs 254 whereupon the carriages 258 are adjusted laterally by means of the hand wheel 260. The column is located lengthwise in machine by a stop, not shown. The pistons 267 are then actuated to ram the connecting angles 28 and wide flange H-column connections 21 against the web of the column whereupon the voltage is applied in the manner described in connection with the previous machines. The above operations are then reversed to permit the propulsion of the column to the next station by means of the wheels 264 driven by motor 265.

As shown in FIG. 21, the rollers 264 of the longitudinal welding machines 179' and 185 consist of the collar portions 290 of steel integrally formed with the flanges 291. The collars 292 of electric insulating material fit within the steel collars 290 and are integrally formed with the enlarged portions 293, the insulated sleeves 292 fitting within the collar 290 and the enlarged portions 293 of insulated material abutting the flanges 291. It will be noted that the rollers 264 are keyed to the shafts 263 by means of the pins 294. By means of this construction, employing two separate shafts with a space therebetween, the wide flange H-column connector 21 carried by the web of the column 175 is provided with clearance, as would the channel 295, were the column reversed (FIG. 21). It will be also noted that sufficient clearance is provided from the flanges of the rollers 264 for the seat or shelf angles 296 and the butt welded T 297 carried by the flanges of the column. This roller construction also applies to the hold down and propulsion machines 184.

As shown in FIG. 22, there is shown a modified form of construction wherein the rollers consist of the now innermost flanges 298 of steel integrally formed with the now outermost sleeve portions 299 which receive therewithin the insulation sleeves 300, the sleeves 299 and 300 being mounted on the shafts 301 and fixed thereto by means of the pins 302 having the insulative sleeves 303. By means of this construction, it will be seen that the inward spacing of the flanges 298 provides sufficient clearance for the splice plates 19. The longitudinal edges of which are coterminus with the longitudinal edges of the flanges.

Referring now particularly to FIG. 23, there is shown a still further modified form of roller construction wherein a unitary shaft 304 is provided, thus eliminating one of the motors which drive the rollers. A pair of rollers 305 having the rims 306 disposed outermost are keyed to the shaft 304 by means of the keyways 307 provided therein, the keys 308 and the nut and bolt assemblies 309 which pass through the keys 308 and the flanges 310 of the collars 311 connected to the rims 306. By means of this construction, the flanges of the beam or girder 312 will rest on the rollers 305 intermediate the rims 306 with clearance being provided between the rollers for the L-shaped angle connections 313.

The longitudinal welding machine thus described may be used for the fabrication of girders or any similar work requiring multiple details to be attached and work to be done on all four surfaces. The longitudinal welding machine would be particularly practical for very large quantities of the same or similar work. The work will be shunted progressively from the stations 177 through 182 with the operations being performed simultaneously on six separate pieces. At station 178, connection details would be welded to the webs of the columns. On moving the beam, girder or column to the station 179, the same would be stopped and revolved ninety degrees whereupon the details would be welded to the flanges at station 180, including splice plates, fills and similar connections. At station 181, there is milled the base connections of the column (or both ends of the H-column if the member were a particular piece calling for the same).

At station 182, where advisable, twin, opposed multiple drilling heads 176' are introduced for drilling the columns or the like, especially where the member does not require other operations at a particular station. Said transversely disposed drill heads 176' shall be mounted on carriers 274 of machine 179' and 185 shown in FIGURE 20, with flanges of intermediately located shape 175, vertical as shown at station 182 of FIGURE 16 and also shown in FIGURE 21. With this addition, the columns would be handled once to completion—raw material to finished product. Stations 177, 178 and 180, 181 could be combined. However, the economy would complicate the machine. Thus, there has been provided a continuous production line technique.

As shown in FIG. 1, shop punched holes will be used for spacing, locating and thereby provide for temporary, erection and securements in the field. The temporary erection field bolts 37 will be later replaced by riveting, high tensile power driven bolts or welding as job requirements dictate. Wherever possible and practical, welding will be employed for shop work, with allowance for field erection requirements stated above. Details will be standardized wherever possible. Although the system has been illustrated in connection with typical buildings, it can be applied to all types of structures and metal work, as will be obvious.

It should now be apparent that there have been provided the following improved welding practices: (1) a new idea of adding or inserting limited areas of fusible metal between large contact surfaces to limit the area of resultant welds; (2) a new concept of welding with applied projecting beads or ridges; (3) a new concept of butt end to surface welding by machine; (4) a new concept of butt to surface welding of connecting details by machine; (5) a new concept of a butt to surface welding of wide flange H sections and of wide flange U sections to main members by machine, as well as other standard steel shapes, such as L's and T's; (6) a new concept of machine pressure resistance welding of any and all details and attachments; (7) a new practice of machine pressure welding of three or more pieces of metal together by means of created limited areas of fusible metal, said areas being created by building up of ridges with additional material on certain surfaces or the insertion of loose metal material between the contact surfaces.

To insure uniform welding and depth of penetration over the total desired area, the welding current may be alternately passed through localized, restricted, adjacent areas of the work or through separate, contacting elements of the work and built up members. Current would also be a high speed flow-no flow cycle in one direction. This would cut down the instantaneous current required and the overall electrical capacity.

Although welding by applied ridges or projecting elements of details is preferred, due to progressive grain growth and expulsion of foreign matter, other types of welding may be substituted such as localized welding of large contacting areas by sectionalized dies, with certain recessed areas to provide restricted, localized and sectionalized contacting areas. The use of these with sequence current welding to effect localized welding areas, as is done with applied ridges, limits the peak electric current demand which is an advantage. These dies, empty, may be also used for localized pre-heating of shape.

It should also be apparent that applied projecting ridge or bead machine pressure welding has the following advantages:

(1) Full and close control of welding conditions, such as voltage, amperage, temperature, flash gap, flash time, welding pressure, pressure time. When the proper combination of factors is found, the machine can be set to duplicate them repeatedly and thus achieve uniformly good welds.

(2) Complete facilities for all types of inspection, testing, control, observation and experimentation can be made economically available. Also, repair and strengthening of welds improperly made due to unavoidable accidental causes may be effected.

It will also be apparent that the overall machine layout, the routing and processing of the work has the following advantages:

(1) Automatic centering of members longitudinally to get exact finished length, especially where the raw material is not the correct length.

(2) With these layouts, the material is handled only once to completion—raw material to finished product.

(3) The operations of tape and ruler measuring, making of templates, center punch marking, chalk or paint spotting, multiple handling and turning, delays and inaccuracies, punching, sub-punching, reaming, trucking and storage between operations, assembly bolting, and many other operations are eliminated.

(4) Pressure pistons would be provided with controls and indicators for the amount of closure, amount of gap, time of gap, amount of pressure, retraction, etc. in order to control the cycle of flash welding. These would be operated with volt and ampere controls, providing full close control of operation.

(5) The application of a progressive, complementary work station; continuing, multiple-stage material travel (both longitudinal and transverse) belt conveyor, roller propulsion, production line principle and technique to the fabrication of structural steel members.

By the use of both horizontal acting and vertical acting machines, the member need not be rotated, thus eliminating a station. Also, for clarity, separate stations are shown for each of the specific operations, but for most work, several operations can be performed simultaneously or consecutively at the same station.

The units in the longitudinal welding machine can be rearranged to suit and handle any type of work, i.e., girders, columns, plate girders, built up columns, etc. Individual units can be made inoperative where their particular work is not required and the member will not be stopped at that station, or else they can be lifted on the mono-rail and reset elsewhere for work on other members.

An additional station or two may be installed on the longitudinal welding machine for automatic guided cutting torch work, where required. With this addition, all major work usually performed is thus possible.

It will be apparent that the principles of the individual machines and their layout and the processing of the work is fundamentally the same and that they can be rearranged in different order and in different patterns. Thus, the longitudinal welding fabricating machine can be rearranged for transverse material travel by adding the other stations back of the single station of the transverse beam and girder machine previously described and shown in FIGURE 8 and adapting the design of the individual machines to that of the basic design of the machines shown on this layout. Conversely a very simple, inexpensive beam and girder welding machine layout can be arranged on the longitudinal travel principle of FIGURE 16.

For certain types of work, a carrier, plate carriage, or angle framed basket with a length indicating scale can be set in the rollers to carry the member. Ordinarily, the machines would be used for long runs or for work on identical members. With the scaled carrier locating end of the member the measured distance from any individual machine, the machine's work can be located and performed at any selected spot on the member. This enables short runs of identical members or dissimilar members to be handled economically and expeditiously. Also, members such as channels, T's and Z's, unsymmetrical about one or more axes, clamped to the carrier, can be handled.

Individual machines may be adapted and made to perform their operations in the vertical plane or axis rather than the horizontal plane shown, i.e. the welding machines would have the pressure pistons arranged vertically one over the other and details may be welded on beneath and on top of the surface of the work. With powered rubber tired wheels and swiveling wheels substituted, the machines may be a mobile floor unit for operating in, on or around members or assemblies that are not suited for movement. They may likewise be suspended from an overhead traveling crane for similar operations in the work area.

Punching and riveting machines with closed ring frames or open jaw C-frames can also be incorporated in any of the layouts where the work requires them. The work would pass longitudinally through the closed ring frames.

The machines may duplicate and assemble, the presently used, standardized details of the members merely by the substitution of machine welding for punching and riveting. Except for this, all other features of the completed work may be exactly the same.

All of the present day standardized riveted work can be duplicated exactly in its entirety by the production line or assembly line technique previously described. As mentioned above, punching (or drilling) and riveting machines can be set up on the line. Also, guided cutting torches for coping and blocking, ending milling machines and cross milling machines to substitute for chipping.

Most fabricating is done to order for various customers under widely varying specifications. Details and connections specified vary widely. Apparatus and processes therefore must be flexible and versatile to handle this by the batch technique. It is apparent that existing, standardized fabricating machines can be used in these fabricating layouts.

Also that the rams, platens and carriages of FIGURES 9, 10, 13, 18, 19 and 20 are capable of carrying, advancing, exerting pressure with, using, and withdrawing any type of attachable, changeable fabricating heads, tools, fixtures, clamps, punches, and dies equipped with necessary independent, rotating reciprocating, pulsating power drives for any fabricating operation. Layout would be equipped with required utilities services such as electricity, compressed air, gas, water, oxygen, fluid pressure.

The rotating mechanism used as station 179 may consist of heavily toothed endless roller chains suspended over the tracks and supported on basic propulsion or welding machine base by four posts and a cap plate. The chain passes over main overhanging sprockets and may be driven and looped by motor, reduction gears, shafting, gearing, sprockets and interlocked controls and may be raised, lowered, or revolved with material in loops. Two mechanisms near the ends of the shape are used, material entering longitudinally into the loops. On revolving the structural member, roller width is readjusted and on lowering, material passes onto the next work station.

With the addition of machines as described above, the production line technique could be profitably applied to the practice of hand welding. In short, the welding machines 179' and 185 only in layout of FIG. 16 may be omitted and replaced by manual welding. All the other advantages would prevail. With two opposite sides of member identical or similar, one side would be welded up, the chain would revolve the member 180 degrees and the welding processes repeated at the same station upon the other sides. At two stations, welding would be completed; all done by hand. With hinged or retractable templates, markers or location indicators and fixed quick action clamps, details would be accurately and speedily placed and secured.

For rigid moment connection frames with fully continuous girders and beams, it is proposed that an I shape be used with end reinforcing cover plates extending from a point ⅛ of span to support. The connection would be a deeper, overlapping welded I shape, of top and bottom notch, lapped, web plate, an excessive area top flange plate and a bottom flange plate of required area, for a high neutral axis, as in FIG. 2. The top flange would be fitted and welded all around in the column trough. Alternate top flange connections are an octagonal plate split parallel to the column web, notched to fit column flanges and into a trough fully welded to wall four beams and column or two low stem, wide flanged T's or angles similarly used, or high strength alloy steel bars extending through holes in column flanges welded thereto and to the top flanges and cover plates.

Between propulsion and welding machines unpowered, idler, guide, supporting conveyor rolls, carriages would be used. Supporting rolls would be manually adjusted for width. Also, upper rolls, which would trail and be weighted to improve traction. Attached, between carriages, would be channels carrying additional lower rolls.

What I claim as new and desire to protect by Letters Patent of the United States is:

1. A welding machine comprising base means, carriage means mounted on said base means and adapted for transverse movement thereon, means for adjusting the position of said carriage means relative to said base means, a pair of oppositely disposed rams slidably mounted on said carriage means for transverse movement thereon, die block means carried by each of said rams and adapted to engage the opposite sides of a structural member extending longitudinally of said base means thereabove, means for moving said rams and die blocks against the structural member relative to said base means and for withdrawing the same therefrom, each of said die blocks being adapted to support thereon a detail to be welded to the structural member, means for applying voltage across said die blocks whereby to electrically weld the details to the structural member, means for locating and securing the structural member to a predetermined lengthwise and transverse position intermediate said die blocks and details, track means for supporting said base means rotatably thereon, and base means moving means for adjusting the position of said base means along said track means, said ram moving means comprising a pair of oppositely disposed cylinders, pistons within said cylinders, piston rods connected to said pistons, and fluid supply means for alternately pressurizing said cylinder on opposite sides of said piston whereby to reciprocate said piston rods, said rams being fixedly carried by the outer ends of said piston rods, said carriage means being composed of a pair of oppositely disposed carriages adapted for transverse sliding movement relative to said base means and structural member, a pair of oppositely disposed laterally aligned shafts journalled in said carriages having their inner ends in laterally spaced relationship to each other, flanged roller means carried by the inner ends of each of said shafts and adapted to support and guide thereon the structural member at opposite edges, and means for driving said roller means and shafts.

2. A welding machine according to claim 1, said track means comprising a pair of longitudinally extending, laterally spaced outer rails and a central rail therebetween, said base means moving means comprising roller means journalled at opposite sides of said base means and adapted to ride said outer track means and locking means carried by said base means adapted to engage said central rail whereby to fix the position of said machine relative to said tracks.

3. A transverse welding machine comprising longitudinally-extending track means, transverse conveyor means adapted to feed longitudinally extending structural members across said track means, end welding machine means at opposite ends of said track means adapted for movement thereon from each other, means for moving said end welding machine means toward and away from each other, intermediate welding machine means mounted on said track means intermediate the ends thereof and intermediate said end welding machine means, means for moving said intermediate welding machine means along said track means, each of said end welding machine means comprising base means adapted for longitudinal movement on said track means, carriage means mounted on said base means adapted for longitudinal movement thereon, means for moving said carriage means relative to said base means, a pair of oppositely disposed rams adapted for sliding transverse movement on said carriage means, die block means carried by each of said rams and adapted to support therewithin a detail to be welded to the opposite sides of the structural member, means for moving said rams and die block means towards and away from the structural member, pillow block means carried by each of said base means inwardly of said carriage means adapted for vertical sliding movement relative to said base means and adapted to raise the structural member above said conveyor means for positioning same intermediate said die block means, means for raising and lowering said pillow block means, hold down means carried by said pillow block means adapted to hold down the structural member during the welding operation, each of said intermediate welding machine means comprising a base means adapted to move longitudinally of said track means, a carriage adapted for vertical sliding movement relative to said base means, means for raising and lowering said carriage relative to said base means, a pair of rams oppositely disposed and adapted for transverse sliding movement towards and away from each other on said carriage, means for moving said rams towards and away from each other, die block means carried by said rams and adapted to support thereon a plurality of details adapted to be welded to the structural member intermediate the ends thereof.

4. A transverse welding machine according to claim 3, said transverse conveyor means comprising a plurality of longitudinally-spaced, transversely-extending chain link conveyors, means for adjusting the longitudinal position of said chain link conveyors relative to each other for structural members of varying lengths and stop means carried by said pillow block means of said end welding machine means adapted to stop the structural member intermediate said end welding machine means and to automatically raise said pillow block means and to stop said conveyor means and longitudinally extending roller means adapted to convey said structural members longitudinally after the welding operation has been completed.

5. A transverse, compound, chain welding and preheating machine comprising base means, carriage means mounted on said base means and adapted for vertical movement thereon, means for adjusting the position of said carriage means relative to said base means, a pair of oppositely disposed rams slidably mounted on said carriage means, die block means carried by each of said rams and adapted to engage the opposite sides of a structural member extending longitudinally of said base means thereabove, means for moving said rams and die blocks against the structural member relative to said base means and for withdrawing the same therefrom, each of said die blocks being adapted to preheat the structural member and to support thereon a detail to be welded to the structural member, means for applying voltage across said die blocks whereby to electrically preheat and weld the details to the structural member by means of a series circuit, involving two resistance welds between the three pieces of metal and means for locating and securing the structural member to a predetermined position intermediate said die blocks and details, track means for supporting said base means slidably thereon, means for adjusting the position of said base means along said track means, said ram moving means comprising a pair of oppositely disposed cylinders, pistons within said cylinders, piston rods connected to said pistons, and fluid supply means for alternately pressurizing said cylinder on opposite sides of said piston whereby to reciprocate said piston rods, said rams being fixedly carried by the outer ends of said piston rods, said carriage means being adapted for vertical sliding movement relative to said base means, said rams being adapted for sliding transverse movement on said carriage means and adapted to engage with said die block means the respective opposite sides of the structural member intermediate the ends thereof, said carriage moving means comprising a plurality of substantially vertical externally threaded studs journalled in said base block means and screw threaded through said carriage means whereby to raise and lower the latter upon rotational movement thereof, and means for rotating said studs, said die block means comprising a pair of vertically spaced die blocks carried by said rams, one of said die blocks being adapted to support a detail in a substantially horizontal position, the other of said die blocks being adapted to support a detail in a substantially vertical position whereby to weld one of said details to the structural member in one vertical position of said carriage means and to weld a second detail in another vertical position of said carriage means.

6. A machine for the support, alignment, and longitudinal propulsion and transmission of structural steel members between pre-heating and welding machine units comprising, in combination, a transversely T-grooved supporting base means, a pair of oppositely located T-keyed carriages in said base, each having depending lugs; transversely disposed, laterally aligned, powered propulsion shafts journalled in said carriages; shaft means in said base, means for the lateral converging and diverging of said carriages through said lugs; adjacently located, flanged wheels mounted on the inner ends of said propulsion shafts for the movement of said structural members supported on said wheel rims, in a longitudinal direction; propulsion wheels on said carriages operative to lock the structural member in predetermined location; dual, laterally spaced, transmission channels attached to said carriages, each of said channels carrying longitudinally spaced, transversely disposed, flanged, shape supporting wheels journalled in the webs of said channel means, for the support and carrying of structural members through and between welding and fabricating units and stations.

7. A welding machine comprising base means, carriage means mounted on said base means and adapted for longitudinal movement thereon, means for adjusting the position of the said carriage means relative to said base means, a pair of oppositely-disposed rams slidably mounted on said carriage means for transverse movement toward and away from each other, a die block carried by each of said rams and adapted to engage the opposite sides of a structural member extending longitudinally of said base means, means for moving said ram and die blocks against the structural member and for withdrawing the same therefrom, each of said die blocks being adapted to support a connection detail to be welded to the structural member, means for applying voltage across said die blocks to electrically weld details to the structural member, means for locating and securing the structural member to a predetermined position to lie intermediate said die block and details, longitudinally-extending track means for movably supporting said base means, means for adjusting the position of said carriage base means along said track means and holding the same in its adjusted position, said ram moving means including a pair of oppositely disposed cylinders with pistons therein, piston rods connected to said pistons, fluid supply means for alternately pressurizing said cylinder on opposite sides of said piston to reciprocate said piston rods, said rams being fixedly carried by the outer ends of said piston rods, said carriage means being adapted for vertical sliding movement relative to said base means, means for moving said carriage means on said base means for vertical adjustment thereto, said moving means for vertically moving the carriage comprising a plurality of substantially vertical externally-threaded studs journalled in said base means and screw threaded through said carriage means whereby to raise and lower the latter upon rotational movement thereof, and means for rotating said studs.

8. A welding machine comprising base means, carriage means mounted on said base means and adapted for longitudinal movement thereon, means for adjusting the position of the said carriage means relative to the said base means, a pair of oppositely-disposed rams transversely slidably mounted on said carriage means, die blocks carried respectively by said rams and adapted to be carried toward and away from the opposite sides of a structural member by the rams, means for moving said rams and die blocks toward the structural member and for withdrawing the same therefrom, each of said die blocks being adapted to support a connection detail to be welded to the structural member, means for applying voltage across said die blocks to electrically weld details to the structural member, means for locating and securing the structural member to a predetermined position to lie intermediate said die blocks and details, said locating and securing means including longitudinally-extending track means for movably supporting said base means, relative to the structural member, means for adjusting the position of said base means along said track means and holding the same in its adjusted position thereon, said carriage means further being mounted upon said base means for vertical sliding movement relative to said base means and means for vertically moving the carriage means upon said base means.

9. A welding and fabricating machine comprising longitudinally-extending track means, transverse conveyor means adapted to feed longitudinally-extending structural members across said track means, end welding machine means at opposite ends of said track means adapted for movement thereon, means for moving said end welding machine toward and away from each other, each of said end welding machine means comprising base means adapted for longitudinal movement on said track means, carriage means mounted on said base means adapted for longitudinal movement thereon, means for moving said carriage means relative to said base means, a pair of oppositely disposed rams adapted for sliding transverse movement on said carriage means, die block means carried by each of said rams and adapted to support therein a structural detail to be welded to the opposite sides of the structural member, means for moving said ram and die block means towards and away from the sides of the structural member, pillow block means carried by each of said base means inwardly of said carriage means and adapted for vertical sliding movement relative to said base means and adapted to raise the structural member above said transverse conveyor means for positioning the same intermediate said die block means, and means for raising and lowering said pillow block means.

10. A welding and fabricating machine according to claim 9, and releasable hold-down means carried by the pillow block means to hold the structural member upon the pillow block means during the welding operation.

11. A welding and fabricating machine according to claim 9, said transverse conveyor means comprising a plurality of longitudinally-spaced, transverse chain link conveyors, means for adjusting the longitudinal position of said chain link conveyors, means for adjusting the longitudinal position of said chain link conveyors relative to each other for structural members of varying lengths and stop means carried by said pillow block means of said end welding machine means adapted to stop the structural member intermediate said end welding machine means.

12. A welding machine comprising base means, carriage means mounted on said base means and adapted for movement thereon, means for adjusting the position of said carriage means relative to said base means, a pair of oppositely disposed rams slidably mounted on said carriage means, die block means carried by each of said rams and adapted to be moved towards and away from the respective opposite sides of a structural member extending longitudinally of said base means thereabove, means for moving said rams and die blocks against the structural member relative to said base means and for withdrawing the same therefrom, each of said die blocks being adapted to support thereon a structural detail to be welded to the structural member, means for applying voltage across said die blocks whereby to electrically weld the details to the structural member, means for locating and securing the structural member to a predetermined lengthwise and transverse position intermediate said die blocks and details, said carriage means being composed of a pair of oppositely disposed carriages adapted for transverse sliding movement relative to said base means and structural member, means for moving said carriages towards and away from each other, said locating and securing means including a pair of oppositely disposed laterally aligned shafts journalled in said carriages having their inner ends in laterally spaced relationship to each other, flanged roller means carried by the inner ends of each of said shafts and adapted to support and guide thereon the structural member at opposite edges and means on the carriage means for driving said roller means and shafts.

References Cited in the file of this patent

UNITED STATES PATENTS

| | | |
|---|---|---|
| 1,322,366 | Spery | Nov. 18, 1919 |
| 1,968,079 | Hoffer | July 31, 1934 |
| 2,169,253 | Kotrbaty | Aug. 15, 1939 |
| 2,210,026 | Connors | Aug. 6, 1940 |
| 2,246,579 | Ewertz | June 24, 1941 |
| 2,302,420 | Chapman | Nov. 17, 1942 |
| 2,355,444 | Kenny | Aug. 8, 1944 |
| 2,366,698 | Cole | Jan. 9, 1945 |
| 2,468,371 | Landis et al. | Apr. 26, 1949 |
| 2,467,311 | Hudson | Apr. 12, 1949 |
| 2,533,605 | Mueller | Dec. 12, 1950 |
| 2,551,358 | Andrew | May 1, 1951 |
| 2,749,419 | Larsen | June 5, 1956 |
| 2,821,789 | Steriss | Feb. 14, 1958 |